United States Patent
Thompson

[15] 3,667,376
[45] June 6, 1972

[54] BARBECUE

[72] Inventor: Orla D. Thompson, 40 Owen Boulevard, Willowdale, Ontario, Canada

[22] Filed: July 11, 1969

[21] Appl. No.: 841,020

[52] U.S. Cl. ................99/443 R, 99/446, 99/450, 126/25 AA
[51] Int. Cl. ...........................................A47j 37/07
[58] Field of Search..............99/443 R, 339–340, 99/420–421, 423, 425–426, 427, 446, 450; 126/9, 25 R, 25 A, 25 AA, 25 B

[56] References Cited

UNITED STATES PATENTS

| 2,723,658 | 11/1955 | Schmieding | 126/25 |
| 3,134,320 | 5/1964 | Meyer | 99/340 |
| 3,512,515 | 5/1970 | McGee | 99/450 X |

*Primary Examiner*—William I. Price
*Assistant Examiner*—Arthur O. Henderson
*Attorney*—Fetherstonhaugh and Co.

[57] ABSTRACT

This invention relates to a barbecue that has a rotatably mounted grill for holding the foods in which a device is provided for preventing the travel of liquid fat beyond the outer peripheral edge of the barbecue as the grill is rotated.

6 Claims, 5 Drawing Figures

INVENTOR.
ORLA DENLEY THOMPSON
BY Fetherstonhaugh & Co.
ATTORNEYS

INVENTOR.
ORLA DENLEY THOMPSON

BY *Featherstonhaugh & Co*

ATTORNEYS

BARBECUE

This invention relates to devices for barbecuing meats and is particularly concerned with the small "pan" type outdoor barbecue which essentially consists of a shallow pan for holding charcoal and a screen-like grill on which meat is supported above the glowing charcoal.

The chief operating difficulty of the above type of barbecue is that as the melted fat dripping from the meat being cooked falls into the burning charcoal, it tends to flare up. If this tendency is not kept under control, the meat can be so severely burned as to be unusable. Accordingly, it is usual when barbecuing meats, particularly those of the fatty variety, to trim off all excess fat before placing the meat on the barbecue. Further, most barbecues are provided with means for adjusting the height of the grill above the charcoal and while this feature is provided to accommodate variations in the heat given off by the charcoal, it is also used to raise the meat when the dripping fat is causing extreme flare-ups.

However, some people prefer not to trim off the excess fat as they consider doing so is a waste or they particularly enjoy the fatty portions of meat. There is no effective control for this condition other than moving the steak or extinguishing the flare-up with water. Moving the steak is inconvenient or impossible if one has a full grill. Water, while effective, retards cooking.

In view of the above, it is the chief object of this invention to provide a horizontal type of barbecue which includes means for preventing flare-ups caused by dripping fat and which is operative without the need to trim excess fat from the meat or to raise the meat above the charcoal to an unusual degree.

It is a more specific object of the invention to provide a barbecue which reduces dripping fat flare-ups on the meat by means for leading the fat coming off the meat to the outer perimeter of the charcoal pan.

A barbecue according to the invention consists of a pan for holding charcoal or other fuel and a grill rotatably mounted above the pan, the grill being rotatable at a speed to centrifugally urge liquid fats thereon to its outer edge and the barbecue having the improvement of a means for preventing the travel of liquid fat beyond the outer peripheral edge of the grill as it is rotated.

The invention will be more thoroughly understood from the following description of several preferred embodiments thereof as read in conjunction with the accompanying drawings.

Figure 1:
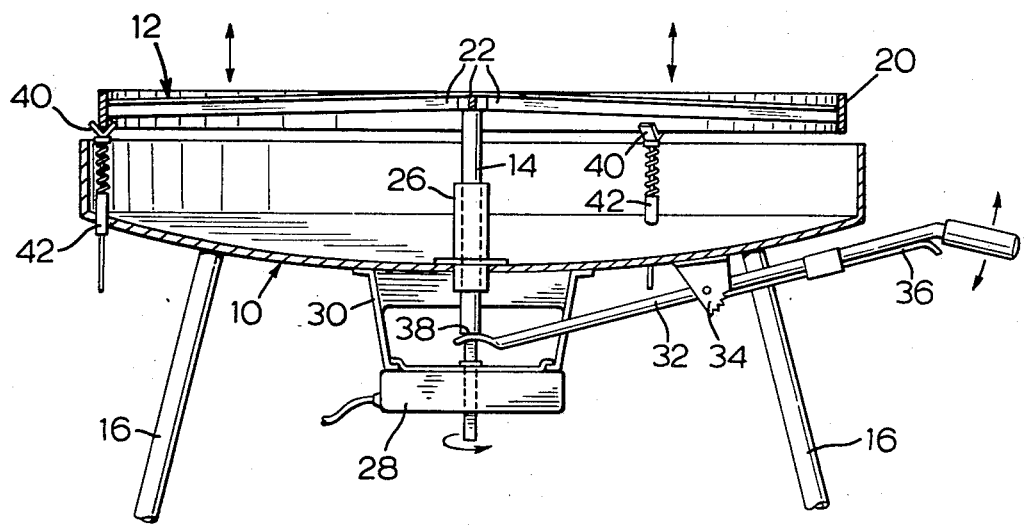
FIG. 1 is a front elevation view, partly in section, of a first preferred embodiment of the barbecue in accordance with the invention.

Referring to FIG. 1, the barbecue of the first embodiment of the invention essentially consists of a shallow pan 10 for holding charcoal or other fuels normally used in such devices and a grill 12 carried on a center post 14. The pan can be made of any material capable of holding a burning charcoal bed, preferably steel. It is supported by three or more tubular steel legs 16. In this regard, however, it should be understood that the pan for holding the burning charcoal could be part of a permanent structure formed of bricks or the like and that the invention is not restricted to the particular type of "portable" barbecue shown in FIG. 1.

Figure 2:
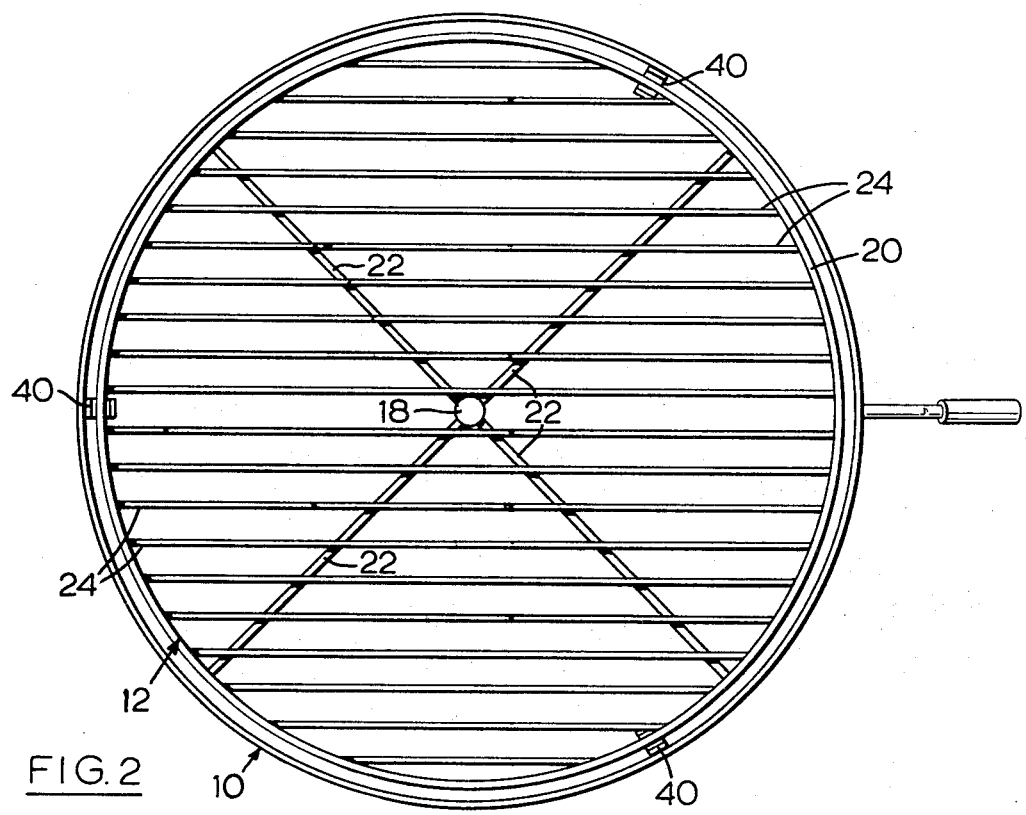
FIG. 2 is a top plan view of the barbecue shown in FIG. 1.

As can best be seen in FIG. 2, grill 12 is circular in shape and is made up of a central hub 18 connected to a peripheral ring 20 by four radially extending struts 22. The struts support a grid of wires 24. The struts and the grid wires are sloped downwardly from the hub to the outer periphery of the grill, as can best be seen in FIG. 1.

The grill is carried by the center post 14 which is mounted for rotation in a bearing-like tubular element 26 positioned at the center of pan 10. At its upper end where it is supported by bearing 26, shaft 14 is round but at its lower end it is square in cross section for connection to an electric motor 28. The latter is supported by and fixed to the underside of pan 10 by a bracket 30.

From the foregoing, it will be appreciated that grill 12 is rotatable and that motor 28 constitutes a means for rotating the grill. This rotatable feature of the grill is an important feature of the invention as is explained in greater detail hereinafter.

Means is also provided for raising and lowering the grill relative to the pan. This feature is common to most barbecues of this type and it consists of a lever 32 pivotally mounted on a bracket 34 fixed to the underside of the pan. The bracket carries a toothed lower edge whereby the grill may be held at any selected vertical position by means of a spring biased elongated dog 36. At its inner end, lever 32 is forked and bears against the underside of a shoulder 38 on shaft 14. This arrangement takes into account the fact that shaft 14 rotates.

Although not essential, it is preferable that motor 28 be a variable speed motor so that the rate of rotation of the grill may be adjusted. In any case, due to the rotation of the grill and the downward sloping of the wire components of the grill and struts 22, melting fat which would normally drop directly into the center area of the burning charcoal is carried by centrifugal force outwardly to the peripheral outer ring 20 of the grill. Thus, by the expedient of the rotating grill, flare-ups resulting from fat dripping into the center of the pan are minimized. For beef of average fat content, the grill is rotated about 40 r.p.m.'s., the speed being varied as required for other meats.

Figure 4:
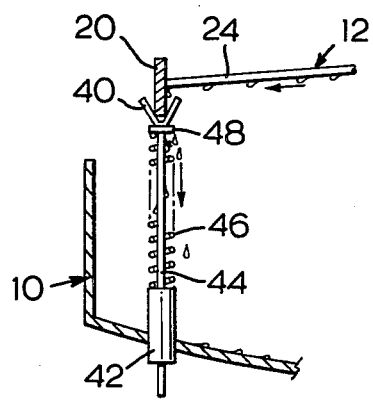
FIG. 4 is an enlarged detail view of one side edge of the barbecue shown in FIG. 1.

In order to prevent the melted fat from flying outwardly from the outer periphery of the grill as the result of the rotation of the grill, a number of wiping devices are positioned to wipe the lower edge of ring 20. These devices comprise spring biased V-shaped fibrous wipers 40 carried in bearing-like tubes 42 fixed to the bottom wall of the pan. This wiper arrangement is shown in greater detail in FIG. 4 from which it can be seen that the wipers 40 are each carried by rods 44 which are capable of vertical sliding movement in tubes 42. A coil spring 46 is compressed between the upper end of tube 42 and a washer 48 positioned immediately beneath wiper 40 to exert a wiping tension. FIG. 4 also shows the path taken by melted fat as it moves outwardly under centrifugal force along wires 24 to ring 20 where the fat is wiped from the lower edge of the ring and falls into the pan at the outer edge. From this point, the fat moves towards the center of the pan by virtue of the curved lower wall of the pan but it burns at a slow rate and in an even fashion as it progresses towards the center of the pan, i.e. there is no tendency for flare-ups occurring in the center of the barbecue. Even should flare-ups occur where the fat drips into the pan after being wiped from the lower edge of ring 20, the flare-ups occur towards the outer edge of the pan, i.e. radially outward of the meat being broiled.

Figure 3:
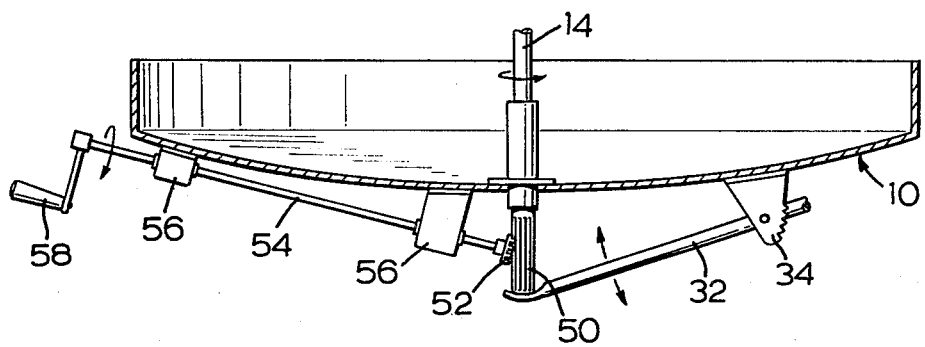
FIG. 3 is a front elevation view partly in section of the pan and center post of a barbecue in accordance with a second preferred embodiment of the invention.

The embodiment illustrated in FIG. 3 differs from the embodiment already described only in the substitution of a manually operated means for rotating the grill in lieu of the motor arrangement shown in FIG. 1. For the manual rotation arrangement, the lower end of shaft 14 is provided with elongated gear teeth 50 which mesh with a ring gear 52 carried at the inner end of a rotatable rod 54 supported by a pair of brackets 56 attached to the underside of the pan. A crank handle 58 is fixed to the other end of the rod. As a further modification, the inner end of the height adjusting lever 32 bears against the lower end of shaft 14.

Figure 5:
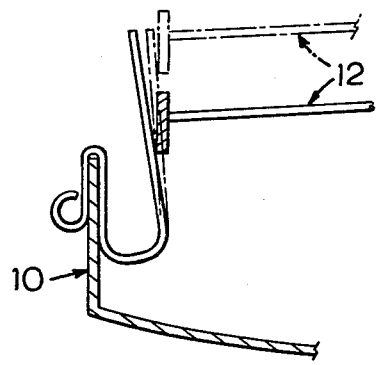
FIG. 5 is a view similar to FIG. 4 but showing a modified form of the arrangement for preventing melted fat from flying off the outer edge of the grill as it is rotated.

FIG. 5 shows a modified form of wiping arrangement for wiping ring 20. This consists of one or more clip-like devices fixed to the outer wall of pan 10 and which bear against the ring 20 regardless of the height of the grill.

The means for rotating the grill is not of basic importance. The essential thing is that it be rotatable to hurl the fat outwardly and that the barbecue includes means for preventing the fat from travelling beyond the peripheral edge of the grill as it is rotated. The wiping means illustrated are examples but any means capable of deflecting or directing the fat downwardly into the pan and preventing it from being thrown substantially beyond the peripheral edge of the barbecue are intended to be within the scope of the invention.

What I claim as my invention is:

1. In a barbecue having a pan for holding charcoal or other fuel and a grill having a shaft, said shaft being rotatably mounted to position said grill above the pan for holding foods, said grill being rotatable at a speed to centrifugally urge liquid fats thereon to its outer edge, the improvement of collecting means at the outer peripheral edge of said grill for preventing the travel of liquid fat beyond the outer peripheral edge of said barbecue as it is rotated and transfer means for directing fat on said collector means downwardly into the pan.

2. In a barbecue as claimed in claim 1 wherein there is provided a drive means for rotating said grill in operative connection with the lower end of said shaft.

3. In a barbecue as claimed in claim 2 wherein said drive means is a manually operated crank mechanism fixed to the underside of said pan for rotating said grill, said crank mechanism having a crank handle carried at its outer end and being operatively connected to the lower end of said shaft at its inner end through gearing means.

4. In a barbecue as claimed in claim 1 in which said transfer means comprises a wiper bearing against the underside of the outer peripheral edge of said collecting means, said wiper means being spring biased into contact with the outer peripheral edge of said collector.

5. In a barbecue as claimed in claim 1 in which said grill consists of a central hub fixed to said shaft, a plurality of radially extending struts, extending to said collector ring, a plurality of wire elements supported by said struts, said struts and said wires being sloped downwardly from said hub to said outer collector ring.

6. In a barbecue as claimed in claim 2 wherein said drive means is driven by an electric motor.

* * * * *